United States Patent [19]

Giencke et al.

[11] Patent Number: 5,580,908
[45] Date of Patent: Dec. 3, 1996

[54] POLYMER MIXTURES

[75] Inventors: Astrid Giencke, Hofheim; Robert Kiehl; Gerd Walz, both of Wiesbaden; Bernd Mergardt, Eltville, all of Germany

[73] Assignee: Hoechst Aktiengesellschaft, Germany

[21] Appl. No.: 515,516

[22] Filed: Aug. 15, 1995

Related U.S. Application Data

[63] Continuation of Ser. No. 234,542, Apr. 28, 1994, abandoned.

[30] Foreign Application Priority Data

Apr. 30, 1993 [DE] Germany .................. 43 14 298.2

[51] Int. Cl.[6] .................. C08K 3/20; C08L 63/02
[52] U.S. Cl. .................. 523/412; 106/19 F; 525/529; 525/530
[58] Field of Search .................. 525/529, 530; 513/414, 412; 106/119 F

[56] References Cited

U.S. PATENT DOCUMENTS 5,272,188  12/1993  Kriessmann et al. .................. 525/530

*Primary Examiner*—Melvyn I. Marquis
*Assistant Examiner*—D. Aylward
*Attorney, Agent, or Firm*—Bierman and Muserlian

[57] ABSTRACT

Polymer mixtures comprising at least one amino group-containing polymer A) and at least one polymer B) of ethylenically unsaturated monomers, which mixtures are obtained by reacting an epoxide with an amine in the presence of the ethylenically unsaturated monomers, and then arrying out free-radical polymerization. These polymer mixtures are employed for the preparation of binder vehicles for water-based printing inks and print varnishes.

8 Claims, No Drawings

POLYMER MIXTURES

PRIOR APPLICATION

This application is a continuation of U.S. patent application Ser. No. 234,542 filed Apr. 28, 1994, now abandoned.

The invention relates to polymer mixtures having a bi- or multimodal structure, which are used as a component of aqueous binder vehicles for printing inks and print varnishes.

For the application of binders to printed articles, it will be necessary in future to work increasingly with water instead of with organic solvents, since not only price and availability but also, in particular, ecological and workplace safety aspects are becoming more and more part of the general consciousness. The water-dilutability and the stability of these aqueous inks is principally achieved, as a rule, by the electrostatic interaction of charged sections of polymer, in which context anionic stabilization is of primary interest. Cationic binders, on the other hand, have so far played almost no role, despite all the advantages which they offer both in terms of preparation and of the subsequent removal of the binder by deinking.

For instance, DE 41 15 731 describes aqueous ink compositions in which the partial use of cationic resins is intended to provide improved ease of deinking. The inks are produced by mixing commercially available acrylic resins with additional components.

Furthermore, DE 32 32 660 describes aqueous coating compositions which are obtained by mixing cationic resins with lipophilic polymers. Disadvantages here are the separate preparation of the individual components and the stability of the dispersion, which can only be achieved by adding a further amphoteric resin.

The object of the present invention was to develop new polymer mixtures and solvent-free aqueous dispersions of such polymer mixtures having a cationic structure, and up-to-date processes for their preparation. This object has been achieved in accordance with the invention by the preparation of bi- or multimodal polymer blends or aqueous dispersions by successive addition and addition polymerization methods. For this purpose the synthesis is initially carried out, in a solvent which is substantially inert toward addition reagents but is nevertheless capable of undergoing free-radical polymerization, of an amino group-containing synthetic resin in the form of an epoxy-amine adduct which, after inversion of the mixture in water and a neutralizing agent, takes over the role of emulsifier and stabilizer in the subsequent emulsion polymerization. In this procedure, the monomer or monomer mixture which was initially used as solvent is used in the second step of the process for building up the hydrophobic latex particles. In this way, a stable, completely solvent-free dispersion is obtained which is also emulsifier-free in the conventional sense. As an alternative to this, the unsaturated monomers can also be subjected to free-radical polymerization directly, in the resin, at elevated temperature to produce a polymer blend which is employed as dispersion concentrate.

The invention thus relates to polymer mixtures comprising at least one amino group-containing polymer A) and at least one polymer B) of ethylenically unsaturated monomers, which mixtures are obtained by reacting an epoxide with an amine in the presence of the ethylenically unsaturated monomers and then carrying out free-radical polymerization.

Consequently, the polymer mixtures according to the invention contain at least one amino group-containing resin A) in the form of an epoxy-amine adduct and a resin B) in the form of hydrophobic latex particles, which is insoluble or only sparingly soluble in water, the resin A) being at least partly protonated if the polymer mixture is present as a dispersion.

The epoxy-amine adducts of resin type A) contain at least one amino group per molecule. The lower limit of the amine number should preferably be 40, particularly preferably 100, while the upper limit should preferably be 400, particularly preferably 300. Examples of such epoxy-amine adducts are reaction products of resins containing epoxide groups, preferably with terminal epoxide groups, from the classes of polyglycidyl ethers, polyglycidyl esters and polyglycidyl amines with saturated and/or unsaturated secondary and/or primary amines or amino alcohols. These may be modified on the alkyl radical by at least one primary and/or secondary hydroxyl group, by the dialkylamino group and/or by a primary amino group which is temporarily protected by ketimine formation.

The epoxide compounds according to the invention have on average at least one, preferably two, 1,2-epoxide groups per molecule. They may be both saturated and unsaturated, and also aliphatic, cycloaliphatic, aromatic and heterocyclic, and may also contain hydroxyl groups. In addition, they may contain those substituents which do not cause any interfering secondary reactions under the conditions of mixing or reaction, examples of substituents being alkyl or aryl, ether groups or the like.

Examples of such epoxide compounds are polyglycidyl ethers of polyhydric phenols, for example of resorcinol, hydroquinone, of 4,4'-dihydroxydiphenylmethane or of isomer mixtures of dihydroxydiphenylmethane (bisphenol F), of 4,4'-dihydroxy-3,3'-dimethyldiphenylmethane, of 2,2-bis(4'-hydroxyphenyl)propane (bisphenol A), of 4,4'-dihydroxydiphenylcyclohexane, of 4,4'-di-hydroxy-3,3'-dimethyldiphenylpropane, of 4,4'-dihydroxybiphenyl, of 4,4'-dihydroxydiphenyl sulfone, of tris(4-hydroxyphenyl)methane, and of 4,4'-dihydroxybenzophenone, 1,1-bis(4-hydroxyphenyl) isobutane, 2,2-bis(4'-hydroxy-tert-butylphenyl)propane, bis (2-hydroxynaphthyl)methane, 1,5-dihydroxynaphthalene, bis(4-hydroxyphenyl) ether; and also of the hydrogenation, chlorination and bromination products of the abovementioned compounds and of novolaks (i.e. of reaction products of monohydric or polyhydric phenols with aldehydes, especially formaldehyde, in the presence of acidic catalysts).

The polyglycidyl ethers of polyhydric alcohols are also suitable. Examples of such polyhydric alcohols which may be mentioned are ethylene glycol, diethylene glycol, triethylene glycol, 1,2-propylene glycol, 1,4-propylene glycol, 1,5-pentanediol, 1,2,6-hexanetriol, glycerol, trimethylolpropane and 2,2-bis(4-hydroxycyclohexyl)propane.

The term polyglycidyl ethers in the context of this invention is understood to refer preferably to those polyglycidyl ethers of the formula

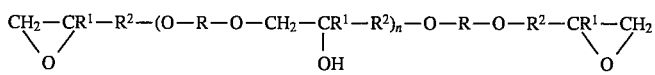

where

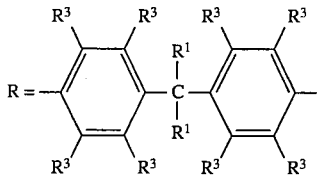

where
$R^1 = $—H and/or —$C_mH_{2m+1}$
$R^2 = $—$(CR^1)_m$—, preferably —$CH_2$—
$R^3 = $—$R^1$, halogen or preferably —H
n=from 0 to 8, preferably from 1 to 6
m=from 1 to 8, preferably 1.

These polyglycidyl ethers have an average molecular mass (bin) of from approximately 200 to 10,000 g/mol, preferably from 300 to 5000 g/mol, and an epoxide equivalent weight of from approximately 120 to 5000 g/mol, preferably from 170 to 2500 g/mol. Resins of this kind are reaction products of epichlorohydrin or methylepichlorohydrin with dihydroxydiphenylmethane (bisphenol F) or dihydroxydiphenylpropane (bisphenol A) and with dihydroxybenzophenone or dihydroxynaphthalene. Polyepoxides of suitable molecular weight are prepared either by selecting the molar ratios of bisphenol and epichlorohydrin or by reacting the monomeric diglycidyl compounds with further bisphenol, with the addition of catalysts such as Lewis acids or phosphonium salts.

The epoxy resins may be completely or partially hydrogenated, or may be employed in mixtures of different structure and molecular mass. It is also possible, for elastication, to replace part of the polyglycidyl ether described by aliphatic polyglycidyl ethers of the formula

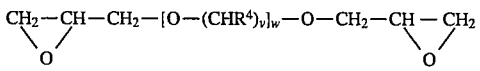

in which
$R^4$=H or a substituted or unsubstituted $C_1$–$C_4$-alkyl radical,
v=from 2 to 6 and
w=from 5 to 50.

Examples are bisglycidyl ethers of polypropylene glycol or polybutylene glycol of various molecular weights. The epoxy resins can also be modified by reaction with long-chain polyalcohols such as 1,6-hexanediol, neopentylglycol, bis-ethoxylated neopentylglycol, neopentylglycol hydroxypivalate and bis(hydroxymethyl)cyclohexane, monoanhydropentaerythritol and polytetrahydrofurandiol, polycaprolactonediol, polycaprolactamdiol or polybutadienediol in the presence of suitable basic or acidic catalysts such as boron fluoride-amine complexes. Whereas polyols containing primary OH groups can be reacted directly with polyglycidyl ethers given suitable catalysis, secondary OH groups are reacted initially with diisocyanate. The resulting NCO-terminal reaction product can then be incorporated without difficulty as a bridge between 2 mol of polyglycidyl ether, with an increase in the molecular weight and the functionality.

Further suitable epoxide compounds are (poly)glycidyl esters of the formula

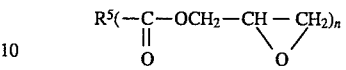

in which $R^5$ is a linear or branched, saturated or unsaturated hydrocarbon radical having up to 40, preferably up to 10, carbon atoms or is a substituted or unsubstituted phenyl radical, and n is at least 2, preferably from 2 to 5. Such polyglycidyl esters of polycarboxylic acids are obtained by reacting epichlorohydrin or similar epoxide compounds with an aliphatic, cycloaliphatic or aromatic polycarboxylic acid such as oxalic acid, adipic acid, glutaric acid terephthalic acid, hexahydrophthalic acid, 2,6-naphthalenedicarboxylic acid and dimerized fatty acids. Examples of such esters are diglycidyl terephthalate and diglycidyl hexahydrophthalate.

Other suitable epoxide group-containing resins are epoxide compounds in which some of the epoxide groups are reacted with amines. Such amino-epoxy resins can also be modified further, in order to reduce the amine number, with saturated or unsaturated polycarboxylic acids and/or hydroxyalkylcarboxylic acids. Examples of aliphatic, cycloaliphatic and or aromatic polycarboxylic acids of various chain length are adipic acid, sebacic acid, fumaric acid, isophthalic acid and dimeric fatty acids. Hydroxyalkylcarboxylic acids are understood as referring to lactic acid, dimethylolpropionic acid or else carboxyl and hydroxyl group-containing polyesters. During the reaction of excess polyglycidyl ether of low molecular weight with polycarboxylic acids and/or polyols, modified polyglycidyl ethers are obtained as the intermediate and are then reacted further with amines and/or amino alcohols.

It is also possible to use heterocyclic polyepoxide compounds such as 1,3-diglycidyl-5,5-dimethylhydantoin, triglycidyl isocyanurate or diepoxides of bisimides.

Another suitable class of polyepoxides is polyglycidyl ethers of phenolic novolak resins, whereby the functionality can be increased from 2 up to about 6 glycidyl groups per molecule. In addition, by defunctionalization with long-chain alkylphenols such as dodecylphenol, it is possible to incorporate elasticating elements.

Other suitable epoxide compounds are described in the handbook "Epoxidverbindungen und Epoxidharze" [Epoxide Compounds and Epoxy Resins] by A. M. Paquin, Springer Verlag, Berlin 1958, Chapter IV, in Lee, Neville "Handbook of Epoxy Resins", 1967, Chapter 2, and in Wagner/Sarx "Lackkunstharze" [Synthetic Resins for Coatings], Carl Hahset Verlag (1971), pp. 174 ff.

The amino groups are introduced by the addition of NH-reactive compounds to the epoxide group. The NH-reactive compounds used are primary monoamines such as methylamine, ethylamine, propylamine, isopropylamine, butylamine, isobutylamine, 2-aminobutane, 4-amino-2-butanol, amylamine, pentylamine, 3-methylbutylamine, heptylamine, octylamine, 2-ethylhexylamine, isononylamine, isotridecylamine, 2-aminomethyl-1-propanol, monoethanolamine, methoxypropylamine, coconut fatty amine, oleylamine, stearylamine, tallow fatty amine, decylamine, dodecylamine, tetradecylamine, hexadecylamine, octadecylamine, cyclopentylamine, cyclohexylamine, 3-methoxypropylamine, 3-ethoxypropylamine, 3-butoxypropylamine, 3-isononyloxypropylamine and/or diamines such as N-cyclohexyl-1,3-propylenediamine, 3'-dimethylaminopropylamine, 2-diethylaminoethylamine, dimethylaminoneopentylamine and the like, or secondary monoamines such as dialkylamines, monoalkylhydroxyalkylamines or dihydroxyalkylamines. Examples of such compounds are dimethylamine, diethylamine, dipropylamine, diisopropylamine, dibutylamine, diisobutylamine, di-sec-butylamine, N-methylbutylamine, N-methylaminoethanol, diethanolamine, dipentylamine, dioctylamine, di(2-ethylhexyl)amine, diisononylamine, N-ethylbutylamine, N-ethylcyclohexylamine, dicyclohexylamine, distearylamine, di-coconut amine, di-tallow fatty amine or else cyclic amines such as morpholine, pyrrolidine or oxazolidine, or substituted or unsubstituted aniline.

It is also possible to employ primary amines of the formula

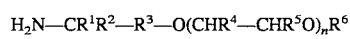
$$H_2N-CR^1R^2-R^3-O(CHR^4-CHR^5O)_nR^6$$

or diamines of the formula

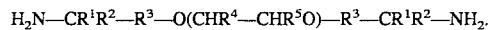
$$H_2N-CR^1R^2-R^3-O(CHR^4-CHR^5O)-R^3-CR^1R^2-NH_2.$$

In this formula $R^1$ and $R^2$ are hydrogen or alkyl or $-CH_2OH$ groups, $R^3$ is a linear or branched alkylene radical, in particular an alkylene radical having 1 to 3 carbon atoms, $R^4$ and $R^5$ are hydrogen or alkyl radicals having 1 to 4 carbon atoms, $R^6$ is hydrogen or an alkyl, cycloalkyl or phenyl radical, preferably an alkyl radical having 1 to 6 carbon atoms, and n=0–5. Examples of such monoamines are: ethanolamine, propanolamine, butanolamine, ethylene glycol 2-aminoethyl ether ($H_2N-CH_2-CH_2-O-CH_2-CH_2-OH$) and diethylene glycol mono(3-aminopropyl) ether ($H_2N-(CH_2)_3-O-CH_2-CH_2-O-CH_2-CH_2-OH$). When primary amines are used, the amine reacts with the epoxide group depending on the stoichiometric ratios available, with enlargement of the molecule. Examples of diamines are: the Jeffamine® M series, Jeffamine® D series and Jeffamine® ED series.

Also suitable are diamines or triamines having primary and/or secondary amino groups, for example laurylpropylenediamine and tallow fatty propylenediamine. With secondary diamines, chain lengthening occurs. Examples of the secondary diamines, preferably long-chain diamines, which are used are N,N'-dialkyldiaminoalkanes such as, for example, N,N'-bis(isohexyl)-1,6-diaminohexane, N,N'-bis(isohexyl) isophoronediamine, N,N'-bis(isohexyl)dimethylhexamethylenediamine, N,N'-bis(isohexyl)-2-methylpentamethylenediamine, N,N'-bis(isohexyl)ethylenediamine and N,N'-bis(isohexyl)-di-(4-aminocyclohexyl)methane or reaction products of monoepoxides, such as saturated glycidyl ethers or glycidyl esters or epoxyalkanes, with primary diaminoalkanes, such as the addition product of 1,6-hexanediamine with 2 mol of the glycidyl ester of Versatic acid (a-branched monocarboxylic acids, especially $C_9-C_{11}$). Monoepoxides which can be employed for this purpose are also saturated or unsaturated glycidyl ethers or α-epoxides of various chain lengths, such as 1,2-epoxydodecane or butylene oxide. It is also possible to employ reaction products of primary monoamines with such epoxide group-containing compounds as a substitute for the secondary amines.

In addition, aliphatic, secondary diamines based on propylene oxide adducts with diols or triols, for example Novarain® N grades, can be used.

The molar ratios between compounds containing epoxide and amino groups should be chosen so as to ensure the complete incorporation of the epoxides. In addition to the chain-lengthening action of the primary amines, the proportion of formation of secondary amino groups from their reaction with epoxides can also be employed for increasing the amine number. All the amines can be reacted simultaneously with the epoxide groups, or a stepwise procedure can be followed. In this way, it is also possible to obtain mixtures of various epoxy-amine adducts. The reaction of the amines begins even at room temperature and is generally exothermic. In order to achieve complete reaction, it is generally necessary to increase the temperature temporarily to from approximately 50° to 170° C.

The epoxide group-containing resin is dissolved, before addition of the amine, in ethylenically unsaturated compounds such as a) acrylic or methacrylic esters, b) vinyl aromatics, c) vinyl esters, or in mixtures of the compounds mentioned.

Among the monomers of group a), those which are preferred are acrylic or methacrylic esters of monoalcohols containing 1 to 18 carbon atoms, preferably n-butyl acrylate, isobutyl acrylate, 2-ethylhexyl acrylate and, in particular, methylmethacrylate. Suitable monomers from group b) are styrene, vinyltoluene, α-methylstyrene or more highly substituted styrenes such as, for example, 2,4-dimethylstyrene. Particular preference is given to styrene, vinyltoluene and α-methylstyrene. Preferred monomers from group c) are vinyl esters of monocarboxylic acids containing 2 to 15 carbon atoms, for example vinyl acetate, vinyl propionate, vinyl pivalate and vinyl Versatate.

The hydrophobic resins B) are copolymers of the abovementioned ethylenically unsaturated compounds, which are obtained either by a high-temperature process at 120°–220° C. (variant I) or by a process at temperatures of 5°–95° C. (variant II) or by a combination of the high- and low-temperature procedures (variant III).

Variant I (dispersion concentrates):

In this case, epoxy-amine adducts A) are synthesized in the presence of the abovementioned unsaturated monomers in a weight ratio of epoxy-amine adduct to monomer of from 1:50 to 50:1, preferably from 1:15 to 15:1, in the temperature range from 50° to 170° C. They are then subjected to free-radical polymerization at 120°–220° C., preferably 135°–175° C. A synthetic resin-polymer blend is obtained which, on addition of water and a neutralizing agent, gives fine dispersions. The polymerization is generally initiated by means of known, thermally decomposing free-radical initiators such as azo compounds, peroxides, per-acid esters or hydroperoxides. The molecular weights (weight average, Mw) of resin A), as determined by the gel permeation chromatography method, are between 500 and 6000 g/mol, those of resin B) being between 10,000 and 100,000 g/mol.

Variant II (dispersions via the direct process):

In this case epoxy-amine adducts A) are synthesized in the presence of the abovementioned monomers in a weight ratio of epoxy-amine adduct to monomer of from 1:50 to 50:1, preferably from 1:15 to 15:1 and particularly preferably from 1:3 to 3:1, in the temperature range from 50°–170° C., and water and a neutralizing agent are added to this melt directly, or else as a solid resin if the monomer content is low, at from room temperature to 140° C., preferably at from 60°–130° C. The resulting emulsion is then polymerized, by the addition of free-radical initiators and—if desired—further monomers, by processes which are known per se at from room temperature to 98° C., preferably at from 30° to 95° C. The dispersions thus produced have a solids content of from approximately 10% to 70% by weight. The free-radical initiators used may be either all known redox systems, or themally decomposing free-radical initiators such as azo compounds, peroxides, per-acid esters and hydroperoxides. tert-Butyl hydroperoxide/ascorbic acid or persulfuric acid salts are preferred. The molecular weights (weight average, Mw) of the resins are determined by the gel permeation chromatography method, and are between 500 and 6000 g/mol for resin A) and between 200,000 and 2,000,000 g/mol for resin B).

Variant III (refining of the dispersion based on variant I):

A dispersion prepared in accordance with variant I is polymerized after the further addition of unsaturated monomers and initiators according to variant II. In this way tri- or multimodal dispersions are obtained.

For the fine adjustment of appropriate molecular weights, it is possible if desired to employ regulators such as, for example, alcohols, thiols or hypophosphorous acid. The polymerization temperatures depend on the desired molecular weight range, on the polymerization initiators used and on the activity optimum of the latter.

The neutralizing agents used may in general be both organic acids such as formic acid, acetic acid, hydroxyacetic acid, propionic acid, burytic acid, lactic acid, valetic acid, caproic acid, oenanthic acid, caprylic acid, pelargonic acid, caprio acid, lauric acid, myristic acid, palmitic acid and stearic acid, preferably formic acid, acetic acid and lactic acid, and inorganic acids such as phosphoric acid, sulfuric acid, boric acid and hydrochloric acid.

In order to prepare stable, fine dispersions it is necessary to set a specific degree of neutralization, which is in General between 20% and 120%, preferably between 45% and 110%, based on the amino groups present.

When the dispersions according to the invention are used as binders for printing inks and print varnishes, their solids content is in general from 5% to 75%.

For the production of stock inks, 5%–65 % strength aqueous mixtures are used with a ratio of polymer A) to polymer B) of from 50:1 to 1:1, preferably from 50:1 to 15:1. The ratio of the polymer mixtures to pigment can vary between 20:80 and 80:20, preferably between 30:70 and 70:30 and particularly preferably between 40:60 and 60:40. The pigment dispersion operations are then carried out with solids contents of from 10%–60 %, preferably from 20%–50 % and particularly preferably from 30%–40 %. The resulting stock inks are then mixed with 5%–65 % strength dispersions having a ratio of polymer A) to polymer B) of from 1:50 to 1:1, preferably 15:1, to produce inks having a solids content which is ideally from 10%–45 %, preferably from 20%–35%, and a pigment content which is ideally from 2%–20%, preferably from 3%–15 %.

The polymer mixtures according to the invention are thus outstandingly suitable for the preparation of aqueous, cationically stabilized binder vehicles for printing inks and, without pigmentation, for overprint varnishes as well. They can also be used as fine-tuning components in water-based print varnish and printing ink systems.

The incorporation of the pigments (for example titanium dioxide, color pigments, synthetic carbon blacks) and also, if appropriate, of the fillers (for example talc, china clay, waxes), dyes, antifoams and leveling agents can be carried out with the conventional milling, mixing or dispersion equipment.

EXAMPLES

Parts and percentages in the examples, unless otherwise stated, are by weight. All reactions are carried out under protective Gas ($N_2$).

I. General procedure for the preparation of epoxy-amine adducts on the basis of Example 1:

A solution is prepared of a commercially available epoxide (Beckopox® EP 140) (518.4 G) in commercially available styrene (180.4 g; stabilized with approximately 20–50 ppm of p-tert-butylpyrocatechol), and dibutylamine (78.8 g) is added at 80° C. over the course of 70 minutes. The mixture is reacted for 2 hours (80° C.), heated, and dimethylaminopropylamine (124.4 g) is added at a constant 120° C. over the course of 30 minutes (cooling is required at times). To complete the reaction, stirring is continued for 2 hours at 120° C. and the mixture is cooled.

The epoxy-amine adducts of Examples 2 to 4 were prepared analogously.

| Ex. | Bisglycidyl ether A | Amine 1 B | Amine 2 C | Solvent D | A:B:C molar ratio (approx.) | [A + B + C]:D ratio by mass (approx.) |
|---|---|---|---|---|---|---|
| 1 | EP 140 | dibutylamine | DMAPA | styrene | 5:2:4 | 80:20 |
| 2 | EP 140 | " | " | " | 5:2:4 | 90:10 |
| 3 | EP 301 | " | " | " | 5:2:4 | 80:20 |
| 4 | EP 301 | DOLA | " | " | 3:2:2 | 80:20 |

EP 140 = Commercial polyepoxy resin Beckopox ® EP 140, 100%, liquid Epoxide equivalent weight 180–192
EP 301 = Commercial polyepoxy resin Beckopox ® EP 301, 100%, liquid Epoxide equivalent weight 450–525
DOLA = Diethanolamine
DMAPA = Dimethylaminopropylamine II. General procedure for the preparation of polymer blends on the basis of Example 5:

A solution is prepared of Beckopox® EP 140 (136.2 g) and Beckopox® EP 301 (178.2 g) in commercially available styrene (101.7 g; stabilized with approximately 20–50 ppm of p-tert-butylpyrocatechol), and dibutylamine (51.7 g) is added at 80° C. over the course of 60 minutes. The mixture is reacted for 2 hours (80° C.), heated, and dimethylaminopropylamine (40.9 g) is added at a constant 120° C. over the course of 10 minutes, with subsequent heating to 150° C. On reaching 150° C., di-tert-butyl peroxide (0.5 g) is added, stirring is continued at 150° C. for a further 3 hours, and then the temperature of the reaction mass is increased to 160° C. and volatile constituents are removed in vacuo. A solid resin of viscous consistency is obtained. The blend of Example 6 is produced analogously.

TABLE 2

| Ex. | Bisglycidyl ether A | Amine 1 B | Amine 2 C | Solvent D | A:B:C molar ratio (approx.) | [A + B + C]:D ratio by mass (approx.) |
|---|---|---|---|---|---|---|
| 5 | EP 140 EP 301 | dibutylamine | DMAPA | styrene | 2:1:2:2 | 80:20 |
| 6 | EP 140 | " | " | " | 5:2:4 | 80:20 |

III. General procedure for preparation of a dispersion via emulsion polymerization:

The product of Example 1 (900 g) is admixed at about 125° C. with a solution of formic acid (60 g) in deionized water (393 g), and diluted further with water (522 g). The resulting emulsion is polymerized fully to give a latex at 90° C., with stirring and the parallel addition of a solution of ammonium peroxodisulfate (4.52 g) in aleionized water (247.7 g) and additional styrene (330 g) over approximately 2–4 hours. After a further hour of stirring at 80°–90° C., the result is a fine dispersion corresponding to Example 7 (41% solids content, viscosity 41 mPa.s, pH=6.4).

The dispersions according to Examples 8 to 15 are obtained analogously.

TABLE 3

| Ex. | Epoxy-amine adduct A | Neutralizing agent | Degree of neutralization % | Latex particles B | A:B approx. | Solids content % |
|---|---|---|---|---|---|---|
| 7 | 1 | formic acid | 70 | polystyrene | 50:50 | 43 |
| 8 | 1 | lactic acid | 70 | " | 50:50 | 43 |
| 9 | 1 | formic acid | 70 | " | 80:20 | 40 |
| 10 | 1 | formic acid | 70 | " | 50:50 | 43 |
| 11 | 1 | formic acid | 60 | " | 50:50 | 43 |
| 12 | 2 | lactic acid | 70 | " | 90:10 | 35 |
| 13 | 2 | lactic acid | 60 | " | 90:10 | 35 |
| 14 | 1 | formic acid | 70 | " | 40:60 | 43 |
| 15 | 1 | formic acid | 70 | " | 30:70 | 43 |

IV. Exemplary procedure for the production of a gloss overprint varnish

The dispersion (General Procedure III) and product of Example 6, dissolved in formic acid/water (solids content 30%, 80% of which is neutralized), are mixed thoroughly for 1 hour in proportions of about 1:1 to 2:1 with, if desired, about 1.5% of butyldiglycol. An overprint varnish is obtained having a printing viscosity of approximately 20 s/4 mm.

V. Exemplary procedures for the production of pigmented printing inks

| Red stock ink: | |
|---|---|
| Epoxy-amine resin solution, 25% strength from Resydrol ® SWE 842/40% WAS/LGEM or product of Example 6 in formic acid/water (solids content 30%, 80% of which is neutralized), | 117.0 |
| Permanent ® Lackrot LCLL 20 | 25.0 |
| Printing ink: 30 parts of stock ink and 44 parts of dispersion gives a printing ink with a pigment content of approximately 7% and a printing viscosity of approximately 25–28 s/4 mm. | |
| Blue stock ink: | |
| Epoxy-amine resin solution, 25% strength from Resydrol ® SWE 842/40% WAS/LGEM or product of Example 6 in formic acid/water (solids content 30%, 80% of which is neutralized), | 111.0 |
| Hostaperm ® Blau B2G | 16.0 |
| Water | 20.0 |
| Printing ink: 80 parts of stock ink and 40 parts of dispersion, which can be obtained by General Procedure III, gives a printing ink having a pigment content of approximately 7% and a printing viscosity of approximately 25–28 s/4 mm. | |

We claim:

1. An organic solvent free polymer mixture comprising at least one amino group-containing polymer A) and at least one polymer B) of ethylenically unsaturated monomers, which mixture is obtained by reacting an epoxide with an amine in the presence of the ethylenically unsaturated monomers selected from the group consisting of acrylic esters, methacrylic esters, vinyl aromatics and vinyl esters and then carrying out free-radical polymerization.

2. A polymer mixture as claimed in claim 1, which is present in the form of an aqueous dispersion containing the polymer A) in at least partially neutralized form.

3. A polymer mixture as claimed in claim 1, which is produced by polymerization of the monomers in the presence of water and a neutralizing agent.

4. A polymer mixture as claimed in claim 1, which is produced by adding, after the reaction of the epoxide and amine, a further quantity of one or more ethylenically unsaturated monomers before the polymerization.

5. A polymer mixture as claimed in claim 1, which is produced by adding, after the free-radical polymerization, a further quantity of one or more ethylenically unsaturated monomers, and carrying out a further free-radical polymerization.

6. A process for the preparation of a solvent-free polymer mixture comprising dissolving an epoxide in ethylenically unsaturated monomers selected from the group consisting of acrylic esters, methacrylic esters, vinyl aromatics and vinyl esters, reacting at least one amine with the epoxide and subjecting the mixture to free radical polymerization.

7. The process of claim 6 wherein the polymerization is effected in the presence of water and a neutralizing agent.

8. A water-based printing ink or print varnish wherein the binder vehicle contains a solvent-free polymer mixture of claim 1.

* * * * *